US012662255B2

(12) United States Patent
Becouarn et al.

(10) Patent No.: US 12,662,255 B2
(45) Date of Patent: Jun. 23, 2026

(54) AIRCRAFT PILOT MONITORING SYSTEM FOR DETECTING AN INCAPACITATION OF THE PILOT; ASSOCIATED METHOD AND COMPUTER PROGRAM PRODUCT

(71) Applicant: THALES, Courbevoie (FR)

(72) Inventors: Loïc Becouarn, Merignac (FR);
Bastien Berthelot, Merignac (FR);
Clément Sarraud, Eysines (FR);
Vincent Ibanez, Merignac (FR)

(73) Assignee: THALES, Courbevoie (FR)

( * ) Notice: Subject to any disclaimer, the term of this patent is extended or adjusted under 35 U.S.C. 154(b) by 257 days.

(21) Appl. No.: 18/359,229

(22) Filed: Jul. 26, 2023

(65) Prior Publication Data

US 2024/0034482 A1 Feb. 1, 2024

(30) Foreign Application Priority Data

Jul. 26, 2022 (FR) ...................................... 22 07666

(51) Int. Cl.
*B64D 43/00* (2006.01)

(52) U.S. Cl.
CPC ..................................... *B64D 43/00* (2013.01)

(58) Field of Classification Search
CPC ......... B64D 43/00; A61B 5/18; B64C 13/042; B64C 13/10
See application file for complete search history.

(56) References Cited

U.S. PATENT DOCUMENTS

| 9,637,133 | B1 * | 5/2017 | McCusker | ............... | A61B 5/18 |
| 9,701,418 | B2 | 7/2017 | Nelson et al. | | |
| 10,426,393 | B2 | 10/2019 | Bosworth et al. | | |
| 11,772,811 | B2 | 10/2023 | Besnard et al. | | |

(Continued)

FOREIGN PATENT DOCUMENTS

| DE | 20 2007 015835 | 3/2008 |
| EP | 4092509 | 11/2022 |

(Continued)

OTHER PUBLICATIONS

Machine translation of FR 3092564 downloaded from Espacenet Jun. 3, 2025 (Year: 2025).*

(Continued)

*Primary Examiner* — Kito R Robinson
*Assistant Examiner* — Tanya C Sienko
(74) *Attorney, Agent, or Firm* — B. Aaron Schulman, Esq.; Stites & Harbison, PLLC

(57) ABSTRACT

The monitoring system (1) is used for detecting an incapacitation of the pilot of an aircraft, said aircraft being equipped with a piloting device (40) which can be actuated manually by the pilot. Same includes: at least one pressure sensor integrating a contact sensor (11, 12) mounted on the surface of the piloting device (40), so as to generate an elementary indicator when a pressure exerted by the pilot on the piloting device is adapted to the use of the piloting device; and a computing unit (2) programmed for processing the elementary indicator delivered by the pressure sensor and for determining a current state of the pilot and, when said current state corresponds to an incapacitation of the pilot, for issuing an alarm.

8 Claims, 3 Drawing Sheets

(56) References Cited

U.S. PATENT DOCUMENTS

| | | | |
|---|---|---|---|
| 2005/0202375 A1* | 9/2005 | Nevo | B64D 10/00 |
| | | | 434/59 |
| 2017/0000339 A1* | 1/2017 | Di Statsi | A61B 5/14542 |
| 2017/0096236 A1 | 4/2017 | Nelson et al. | |
| 2017/0325727 A1* | 11/2017 | Buza | A61B 5/742 |
| 2019/0090800 A1* | 3/2019 | Bosworth | A61B 5/0015 |
| 2019/0092337 A1* | 3/2019 | Chua | B60W 30/14 |
| 2021/0004617 A1 | 1/2021 | Gouraud et al. | |
| 2021/0034053 A1 | 2/2021 | Nikolic et al. | |
| 2021/0070427 A1* | 3/2021 | Lampazzi | G05G 1/01 |
| 2021/0221530 A1* | 7/2021 | Venkataramana | |
| | | | B64D 45/0056 |
| 2022/0127008 A1* | 4/2022 | Venkatesha | A61B 5/18 |
| 2022/0265187 A1* | 8/2022 | Salmon-Legagneur | |
| | | | B64D 45/0053 |
| 2022/0386915 A1* | 12/2022 | Rao | G10L 13/02 |
| 2022/0392354 A1* | 12/2022 | Rao | G10L 25/66 |
| 2022/0396368 A1 | 12/2022 | Besnard et al. | |
| 2022/0405518 A1* | 12/2022 | Atassi | A61B 5/113 |
| 2022/0406201 A1* | 12/2022 | Johnson | G08G 5/58 |
| 2023/0144801 A1* | 5/2023 | Pankok | G05D 1/0688 |
| | | | 701/14 |
| 2023/0297123 A1* | 9/2023 | Feyereisen | G05D 1/101 |
| | | | 701/3 |
| 2023/0343112 A1* | 10/2023 | Berthelot | A61B 5/18 |

FOREIGN PATENT DOCUMENTS

| | | | |
|---|---|---|---|
| FR | 3 092 564 | 8/2020 | |
| FR | 3092564 B1 * | 1/2021 | ............ B64C 13/12 |
| KR | 20180094553 A * | 8/2018 | ............ A61B 5/01 |
| WO | WO 2022/080512 | 4/2022 | |

OTHER PUBLICATIONS

"A flexible, ultra-highly sensitive and stable capacitive pressure sensor with convex microarrays for motion and health monitoring" by Y. Xiong et al., Nano Energy 70 (2020) 104436 (Year: 2020).*

Machine translation of KR-20180094553 downloaded from Espacenet Dec. 19, 2025 (Year: 2025).*

"Multimodal Capacitive Piezoresistive Sensor for Simultaneous Measurement of Multiple Forces" by S. Peng et al. ACS Applied Materials and Interfaces 2020, 12 22179-22190 (Year: 2020).*

"Research progress of flexible capacitive pressure sensor for sensitivity enhancement approaches" R. Li et al, Sensors and Actuators A: Physical, published Nov. 9, 2020 (Year: 2020).*

Preliminary Search Report for FR 2207666 dated Mar. 13, 2023.

* cited by examiner

AIRCRAFT PILOT MONITORING SYSTEM FOR DETECTING AN INCAPACITATION OF THE PILOT; ASSOCIATED METHOD AND COMPUTER PROGRAM PRODUCT

The present invention relates to the technical field of systems and methods for monitoring the pilot of an aircraft.

Some civil aeronautics players plan to change the operational context of certain aircraft so that the crew is reduced to a single pilot during at least part of the flight, the pilot then being alone in the cockpit.

However, the above requires the implementation of procedures for monitoring the pilot, in order to guarantee flight safety.

A number of monitoring procedures have been proposed using physiological sensors carried by the pilot in order to determine certain states of the pilot, such as the level of fatigue, the workload, the level of stress, etc. of the pilot.

For example, document EP3154038 discloses a method for evaluating the state of fatigue of a pilot from the detection of the movements of the piloting devices.

However, such monitoring procedures cannot be used for anticipating an incapacitation of the pilot. Indeed, in the event of incapacitation, the pilot is unable not only to carry out his/her mission, but also to declare incapacitation. Such is the case e.g. during a loss of consciousness following fainting or a heart attack.

It should be noted that state of fatigue and incapacitation are not synonymous. Thereby, while it is possible to use sensors for detecting the movements of the piloting devices, for determining the state of fatigue of the pilot, such sensors do not make it possible to determine an incapacitation of the pilot.

It has thus been proposed to use another type of monitoring system for detecting incapacitation.

FR3098334A1 discloses system for monitoring the state of consciousness of the pilot, based on image acquisition and processing thereof, so as to detect the eye movements of the pilot. If no movement is detected, a signal of loss of consciousness is issued.

It should be noted that state of consciousness and incapacitation are synonymous and the use of images of the pilot for determining the state of consciousness could also be used for determining an incapacitation of the pilot.

However, such a monitoring system would not make it possible to detect very quickly an incapacitation of the pilot, which is essential in certain phases of flight (such as the taxiing phase) which have to stay under the manual control of the pilot. Thereby, any incapacitation of the pilot has to be detected almost immediately, typically in less than half a second, in order to initiate the appropriate countermeasures.

And yet, detection based on the eye movements of the pilot does not make it possible to achieve such speed of detection, if only because of the processing time of each image and the need to acquire a time-dependent succession of images in order to determine the state of the pilot by comparing said images.

Thus, the goal of the present invention is to solve such problem, by proposing in particular a monitoring system making it possible to trigger an alert with a very low latency during an incapacitation of the pilot.

To this end, the subject matter of invention is a system for monitoring a pilot of an aircraft, for detecting an incapacitation of the pilot, the aircraft being equipped with at least one piloting device which can be actuated manually by the pilot, characterized in that the monitoring system includes: at least one pressure detector integrating a contact sensor mounted on the surface of the actuator, so as to generate an elementary indicator when a pressure exerted by the pilot on the actuator is suited to the use of the actuator; a computing unit programmed for processing the elementary indicator delivered by the pressure detector and for determining a current state of the pilot and, when said current state corresponds to an incapacitation of the pilot, for issuing an alarm.

According to particular embodiments, the monitoring system includes one or more of the following features, taken individually or according to all technically possible combinations:

- the pressure sensor is a contact pressure sensor suitable for detecting the contact of the hand of the pilot on the piloting device.
- the pressure sensor is a force pressure sensor suitable for detecting the application of a force by the pilot, on the piloting device.
- the computing unit receives at least one flight context information from an auxiliary system equipping the aircraft, and wherein the computing unit processes the elementary indicator delivered by the pressure sensor taking account of said flight context information.
- flight context information is aircraft flight phase information or information on a value of at least one aircraft flight parameter, the flight phase information being selected among: a taxiing phase, a take-off phase, a cruising phase, and a landing phase, and the flight parameter information being selected among: a height, a speed, an engagement status of the autopilot, a position of a noise wheel steering control, a position of a throttle, a position of a stick, and a position of a rudder-bar.
- a pressure sensor includes, in addition to a contact sensor, a modeling module, the modeling module being apt to calculate the elementary indicator, from the signal delivered by the associated contact sensor.
- the system includes a plurality of pressure sensors and an aggregation module suitable for aggregating all or part of the plurality of indicators delivered by the plurality of pressure sensors into a global indicator as a current state of the pilot.
- the aggregation module selects the elementary indicators to be taken into account for calculating the global indicator according to flight context information.
- the computing unit includes an alarm generation module apt to apply an algorithm using one or a plurality of flight context information items and the global indicator value determined by the aggregation module, for determining whether to issue an alarm.
- a contact sensor is: a mechanical sensor, e.g. an electrical contact sensor; a pressure sensor, e.g. a piezoelectric, resistive or capacitive sensor; or a proximity sensor, e.g. an infrared sensor.

A further subject matter of the invention relates to a method for monitoring the pilot of an aircraft, for detecting an incapacitation of the pilot, said aircraft being equipped with at least one piloting device which can be actuated manually by the pilot, characterized in that the monitoring method comprises the following steps: acquiring, by at least one contact sensor, mounted on the surface of the piloting device, a signal corresponding to a measurement of a pressure exerted by the pilot on the piloting device; processing the acquired signal in order to determine a current state of the pilot; and, when said current state corresponds to an incapacitation, issuing an alarm.

Finally, the subject matter of the invention is a computer program product including software instructions which, when executed by a computing unit of the aforementioned system, implements the aforementioned method.

The invention and the advantages of the invention will better understood upon reading the following detailed description of the different embodiments of the invention, given only as examples and not limited to, the description being made with reference to the enclosed drawings, wherein.

The monitoring system of the pilot of an aircraft is intended for being carried on-board the cockpit of an aircraft (such as an aircraft, helicopter, or equivalent) or the cockpit of a drone, in order to detect in real time (less than half a second) the occurrence of an incapacitation of the pilot.

Figure 1:
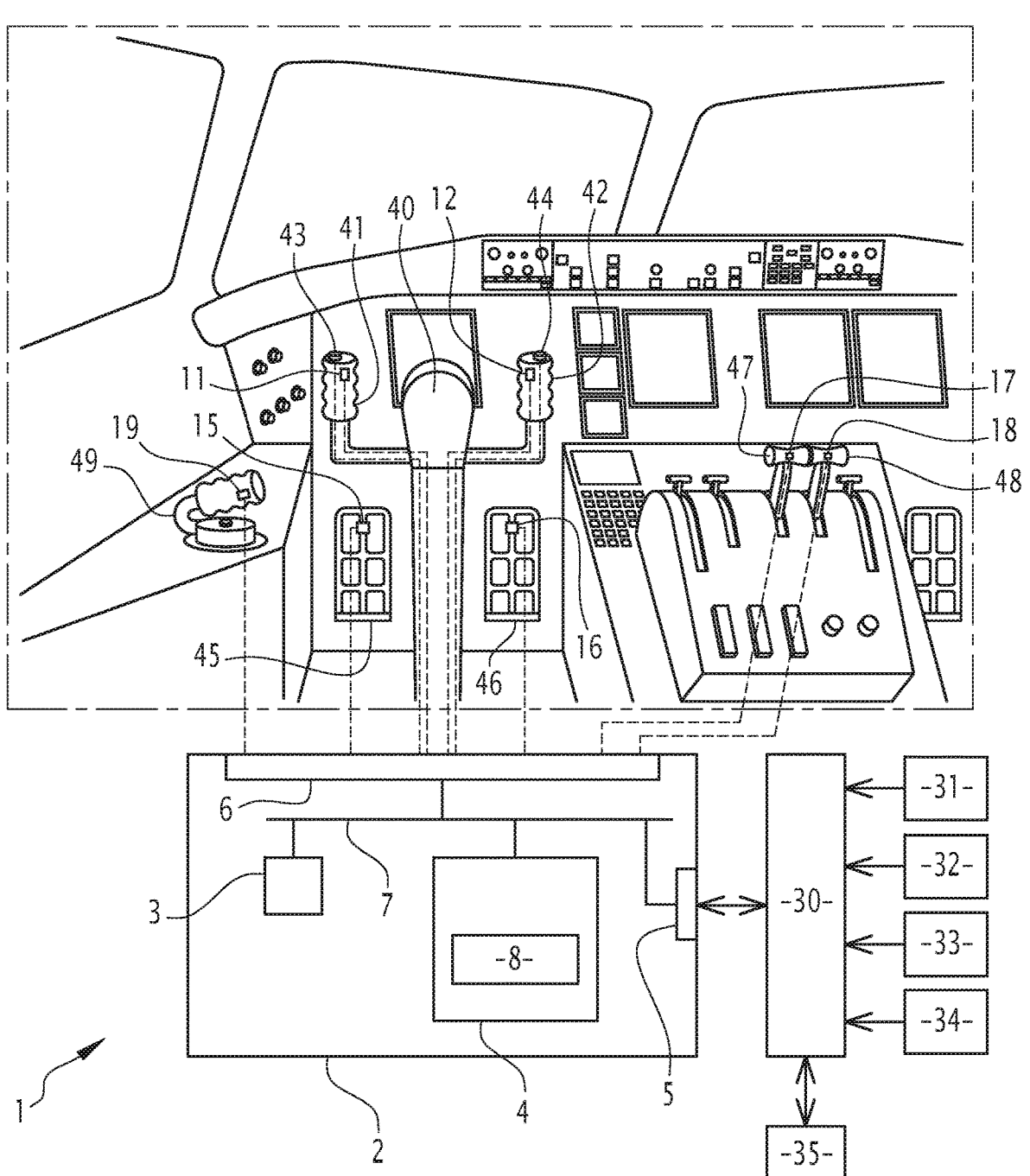
FIG. 1 is a schematic representation of an embodiment of the monitoring system according to the invention.

As illustrated by the embodiment shown in FIG. 1, the monitoring system 1 includes a computing unit 2 and a plurality of contact sensors 11 to 19 connected to the input of the computing unit 2.

The computing unit 2 is a computer comprising means of computing, such as a processor 3, means of storage, such as a memory 4, a set of connectors 6 for connecting each sensor to the computing unit 2, a network interface 5 used for bidirectional communications on a network 30 of the aircraft, and an internal communication bus 7, linking the different components of the computing unit 2.

The memory 4 stores the instructions of computer programs, more particularly same of a monitoring program 8, the execution of which implements a method of monitoring the pilot, which is based on the generation of an alarm when an incapacitation of the pilot is detected from the signals delivered by all or some of the contact sensors.

The computing unit 2 is interfaced with the network 30 of the aircraft. The format of the communications on the network depends on the aircraft manufacturer and the computing unit is thus suitable for sending and receiving messages in the required format (AFDX, ARINC, etc.), more particularly for issuing alarms in the required format.

Different auxiliary systems apt to supply flight context information, Info_context, to the computing unit 2 are also connected to the network 30. For example, an autopilot system 31 indicates the engagement status of the autopilot; a parking brake system 32 indicates the application status of the parking brake; a flight control system 33 indicates the current flight phase of the aircraft; and an instrumentation system 34 indicates one or a plurality of flight parameters, such as the current height of the aircraft or the ground speed thereof.

An alarm management system 35 is also connected to the aircraft network. When the computing unit 2 detects the incapacitation of the pilot, same issues an alarm on the network 30 to the system 35. Depending on the alarm and the operational situation, the system 35 is apt to take the countermeasures required for ensuring the safety of the aircraft.

Each contact sensor is surface mounted on an associated piloting device.

A contact sensor is apt to detect a pressure exerted by the pilot on the piloting device which the sensor equips and to generate a signal intended for the computing unit 2, the signal corresponding to a measurement of a pressure exerted by the pilot on the associated piloting device.

A piloting device equipped with a contact sensor is such that the pilot has to exert a certain pressure on the piloting device if the pilot wishes to manipulate same correctly in order to pilot the aircraft properly. The piloting devices equipped with contact sensors are thus the piloting devices which can be actuated by the application of a force by the pilot. Although such force can be applied by foot or by hand, hereinafter we will speak of piloting devices which can be actuated "manually".

For example, in the embodiment illustrated in FIG. 1, a first left contact sensor 11 and a first right contact sensor 12 are arranged on the stick 40 of the aircraft (on the left handle 41 and on the right handle 42 of the stick, respectively). It should be noted that the invention is not specific about a type of stick (or control wheel) and can be implemented whether the stick is of the type "placed in front of the pilot" (as illustrated in FIG. 1) or of the type "placed on the side" (mini stick with electric controls).

For example again, a second left-hand contact sensor 15 and a second right-hand contact sensor 16 are placed on the left-hand 45 and right-hand 46 rudder pedals respectively.

For example again, a third left-hand contact sensor 17 and a third right-hand contact sensor 18 are placed on the throttle lever of the left engine 47 and same of the right engine 48, respectively.

For example again, a fifth contact sensor 19 advantageously equips the nose wheel steering control 49.

In a variant, other piloting devices could carry a contact sensor, such as a landing gear control lever, a switch or a dashboard screen, an input tool, such as a mouse or a trackball, etc.

Contact sensors can be:

mechanical sensors, e.g. with electrical contact (the contact of the hand of the pilot on a moving part of the sensor equipping the piloting device generating a mechanical action for establishing or interrupting an electrical contact);

pressure sensors, e.g. piezoelectric (in particular piezoresistive), resistive or capacitive (the contact of the hand of the pilot on a surface of the sensor fitted to the piloting device generating a deformation of the sensor leading to a modification of an electrical property of the sensor); or further, proximity sensors, e.g. infrared sensors (the contact of the hand of the pilot on the sensor fitted to the piloting device allowing a detection signal to be reflected).

Different methods for integrating a contact sensor on a piloting device are known to a person skilled in the art.

According to the invention, capacitive contact sensors are used, since the integration thereof is easier. For example, there is the possibility of producing a capacitive sensor (and the associated circuit) by 3D printing on the external surface of the piloting device. The above is particularly advantageous for equipping ergonomic piloting devices, such as handles or joysticks.

Capacitive sensors are more suitable for integration on flight controls since same are very thin, invisible to the pilot and require relatively simple electronic control components.

Moreover, push-button type sensors do not cover all possible positions of the pilot's hand on a piloting device. More particularly, the hand can have very variable positions on the throttle lever between the "full throttle" position (joysticks forward) to the "reverse thrust" position (joystick at maximum rear). On the other hand, it is possible to cover the surface of a piloting device, such as the throttle lever, with a capacitive sensor and thus detect the pilot's activity regardless of the position of the piloting device.

Figure 2:
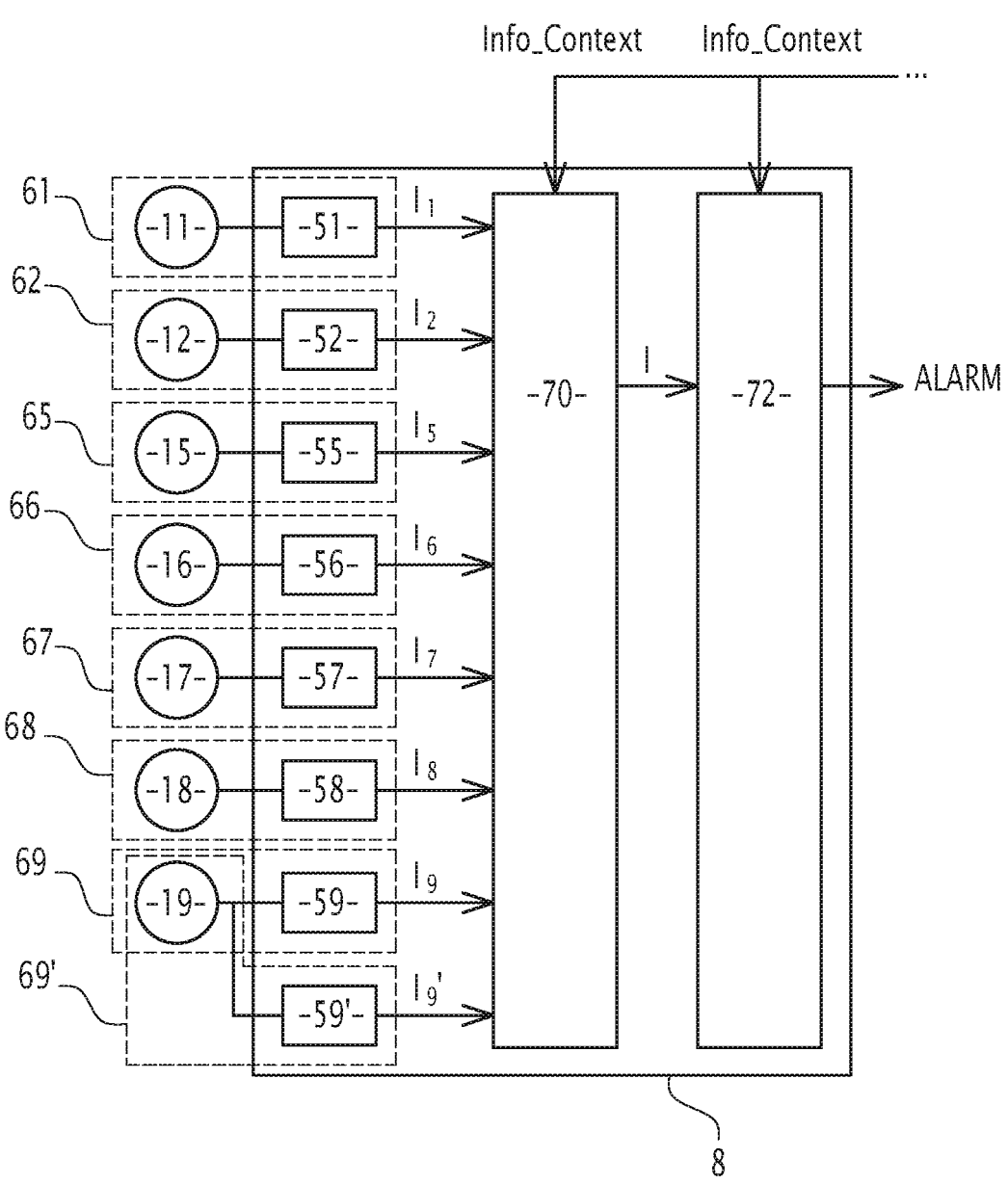
FIG. 2 is a schematic representation of an embodiment of the monitoring method implemented in the system shown in FIG. 1; and, FIG. 3 is a block-representation of the algorithm for generating an alarm of the method shown in FIG. 2.

As shown schematically in FIG. 2, the execution of the program 8 provides the computing unit 2 with different functions, in particular a plurality of modeling modules 51 to 59, an aggregation module 70 and an alarm generation module 72.

Each contact sensor 11 to 19 is associated with at least one modeling module 51 to 59.

A contact sensor and the associated modeling module together form a pressure sensor.

The modeling module is apt to acquire the signal generated by the associated sensor and to determine the value of an elementary indicator which indicates whether the pilot exerts an appropriate pressure on the corresponding piloting device.

The modeling module thus implements a contact model which depends on the nature of the corresponding piloting device, i.e. on the way in which the device should be manipulated by the pilot.

For example, the modeling model compares the pressure measured by the associated contact sensor with a pressure threshold and an indicator is issued when the pressure exerted is greater than the threshold.

In a variant, the contact model takes into account the flight phase for selecting the contact model to be implemented. For example, the flight phase can make it possible to define the value of the pressure threshold to be taken into account.

The detection that the pilot is applying the required pressure onto the piloting device is indicative of an intentional action by the pilot and thus that the pilot is not incapacitated. The invention is thus based on the assumption that in the event that the pilot looses consciousness, the pilot will no longer be able to apply onto the piloting device, the pressure normally required for controlling said equipment.

The plurality of pressure sensors includes at least one contact pressure sensor (or contact sensor hereinafter). A contact sensor should be used for detecting a low pressure exerted by the pilot on the corresponding piloting device (e.g. the model employed uses a low pressure threshold).

Hereinafter, the plurality of pressure sensors advantageously includes at least one force pressure sensor (or force sensor). A force sensor should be used for detecting a high pressure exerted by the pilot on the corresponding piloting device (e.g. the model employed uses a high pressure threshold).

For example, the first sensors 61, 62 integrating the first sensors 11 and 12 which equip the handle 40 are contact type sensors: when the pilot correctly holds onto the left handle in his/her left hand, the pilot applies a pressure detectable by the first left-hand sensor, and when the pilot correctly holds onto the right handle in his/her right hand, the pilot applies a pressure detectable by the first right-hand sensor. Such first sensors are thus used for generating the elementary indicators I1, I2 indicating the simple fact that the pilot has his/her hand correctly placed on the handle.

For example, the first sensors 61, 62 integrating the first sensors 11 and 12 which equip the stick 40 are contact type sensors: when the pilot correctly holds onto the left handle in his/her left hand, the pilot applies a pressure detectable by the first left-hand sensor, and when the pilot correctly holds onto the right handle in his/her right hand, the pilot applies a pressure detectable by the first right-hand sensor. Such first sensors are thus used for generating the elementary indicators I1, I2 indicating the simple fact that the pilot has his/her hand correctly placed on the handle.

For example, the third sensors 67, 68 integrating the third sensors 17 and 18 which equip the throttle levers are contact type sensors: when the pilot correctly holds onto one and/or the other of the levers, without thereby moving the levers, the pilot applies a detectable pressure. Elementary indicators I7 and I8 are generated.

For example again, the sensor 69 integrating the sensor 19 equipping the noise wheel steering control is associated with a first modeling module 59 which uses a "straight line" model for detecting that the pilot has a hand placed on the joystick. It is again a contact sensor. The sensor 69 generates an elementary indicator 19.

An example of a force sensor is given by the sensor 69' integrating the sensor 19 fitted onto the noise wheel steering control and a second modeling module 59' which uses a "turn" model requiring the pilot to exert a high pressure for resisting the return force forcing the joystick to return to the neutral position. It is a force sensor. The sensor 69 generates an elementary indicator 19'.

A sensor is thus used for determining whether a particular intentional action is carried out by the pilot on the corresponding piloting device and, if so, for issuing the associated elementary indicator.

It should be noted that a contact sensor, e.g. a capacitive sensor, could make possible the detection of a low pressure without the need to add a modeling module. However, since the contact sensor is mounted on a curved surface (such as the handle of the joystick), same could be subject to mechanical stresses which lead to the issuing, by the contact sensor, of a signal corresponding to the application of a pressure even when no pressure is actually exerted by the pilot on the sensor. The modeling module then makes it possible to calibrate the contact sensor, e.g. by adjusting the pressure threshold beyond which detection information is issued.

The aggregation module 70 is suitable for aggregating all or part of the elementary indicators at the current instant, for determining a current state of the pilot. For example, the current state of the pilot is a global indicator I taking the value one when it is detected that the pilot is performing an intentional action, or the value zero when no intentional action of the pilot is detected, i.e. that the pilot is incapacitated. In other words, a zero value of the global indicator corresponds to the detection of an incapacitation of the pilot.

The aggregation module 70 advantageously takes into account the flight context information, Info_context, in order to select the elementary indicators to be aggregated for calculating the global indicator. Such flight context information comes from one or other of the auxiliary systems 31 to 34.

For example, if the computing unit 2 receives flight context information according to which the aircraft is in cruising phase and the autopilot is engaged, it means that the pilot has no reason to hold the stick 40. Therefore, elementary indicators derived from signals coming from contact sensors on flight control devices, such as the sensors 11 and 12, should be ignored.

Finally, the alarm generation module 72 is apt to generate an alarm and transmit same to the alarm management system 35. The module 72 executes an algorithm which takes as input, the global indicator I at the current instant in order to decide whether to issue an alarm. Preferentially, the algorithm also uses context information, Info_context.

Figure 3:
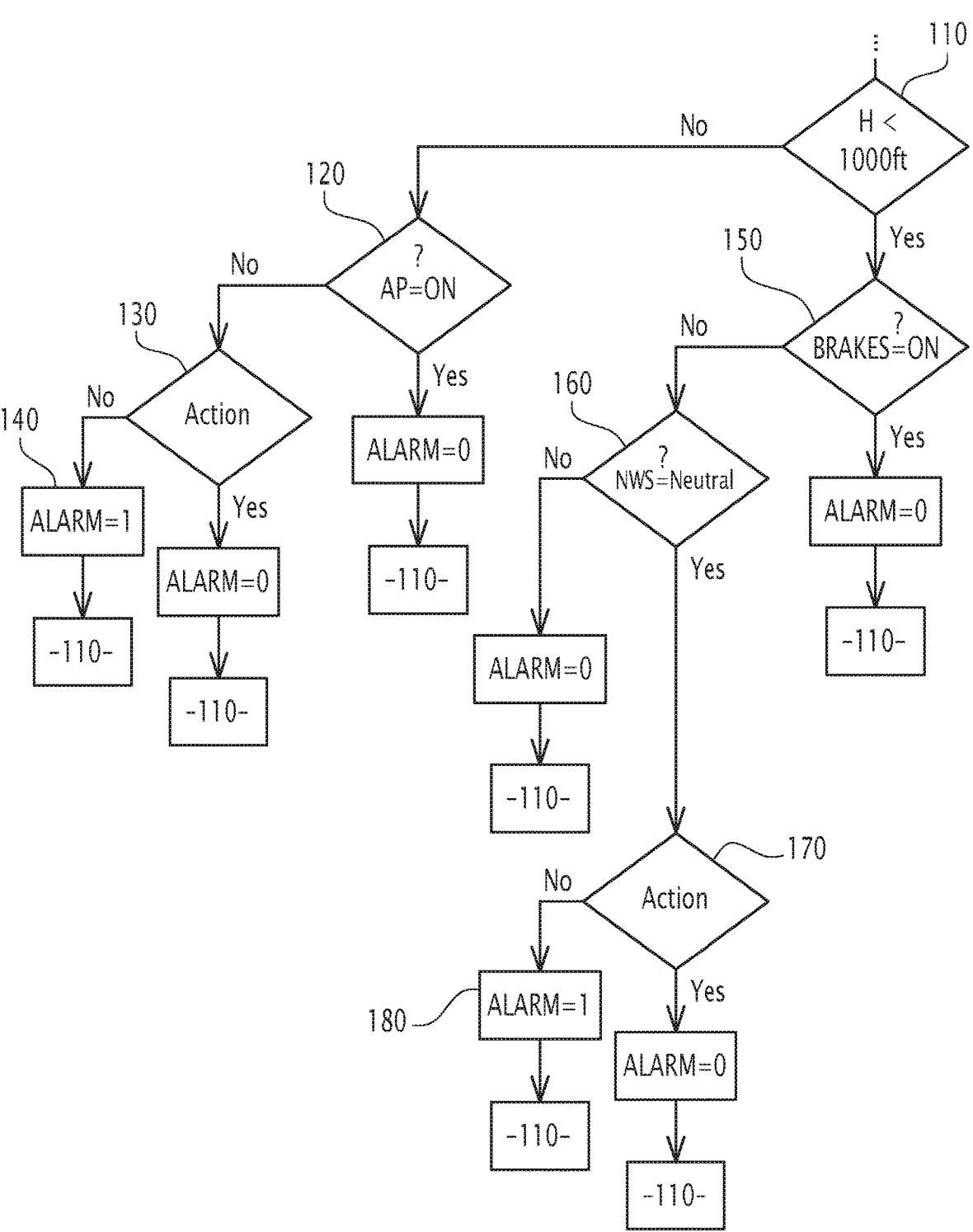

For example, as represented in FIG. 3, the algorithm, which is implemented by the module 72, compares (step 110) the flying height H with a predefined threshold, e.g. equal to 1000 feet.

When the height is greater than or equal to the threshold, the algorithm checks (step 120) whether the autopilot (AP) is engaged ("ON" state).

If YES, the algorithm turns off the existing alarm, if there was one (e.g. by setting the ALARM variable to zero), and loops back to step 110.

If NO, the algorithm verifies (step 130) the value of the global indicator I to know whether the pilot is performing an intentional action.

If YES, the algorithm deletes the existing alarm, if any, and loops back to step 110.

If NO, an incapacitation of the pilot is detected and an alarm is issued (step 140). For example, the value one is allocated to the variable ALARM. The algorithm then loops back to step 110 for a new iteration.

On the other hand, when the height H is lower than the threshold of 1000 feet, the algorithm checks (step 150) whether the parking brake ("brakes") is applied ("ON" state).

If YES, the algorithm deletes the existing alarm, if any, and loops back to step 110.

If NO, the algorithm checks (step 160) whether the Nose Wheel Steering (NWS) control is in neutral position ("Neutral" state).

If NO, the algorithm deletes the existing alarm, if any, loops back to step 110.

If YES, the algorithm verifies (step 170) the value of the global indicator I to know whether the pilot is performing an intentional action.

If YES, the algorithm deletes the existing alarm, if any, and loops back to step 110.

If NO, an incapacitation of the pilot is detected and an alarm is issued (step 180). The algorithm loops back to step 110 for a new iteration.

The future operating mode of aircraft when the pilot will be alone on-board in the landing phase could require having the hands on the stick so as to be ready to react when the height of the aircraft is less than a certain value, herein taken e.g. at 1000 feet. Therefore, if the contact sensors on the stick or on the throttle do not detect any pressure (only sensors taken into account in such situation for calculating the overall indicator), an alarm is issued immediately.

The requirement of having the hands on the stick is not strict above 1000 feet and the elementary indicators deriving from the contact sensors of the stick are not sufficient for detecting incapacitation.

When an alarm is received, the alert management system 35 can begin by issuing an audible alert in the cockpit and wait for the computing unit 2 to suspend the previously triggered alarm, thus indicating that the pilot has taken over control of the aircraft e.g. by immediately putting his/her hands back on the stick below the ceiling of the 1000 feet.

On the other hand, if, during a predetermined time interval, the computing unit 2 continues to issue an alarm, the system 35 moves to countermeasures for taking control over the piloting of the aircraft, e.g. by engaging the autopilot.

It should be noted that FIG. 2 could be read as the different steps of a monitoring method. According to such method, the computing unit 2 performs:

the acquisition of the signals delivered by the different contact sensors, the processing of such signals in order to determine the current state of the pilot: e.g. by first calculating an elementary indicator by checking that the pressure measured by a sensor is suitable for the piloting device being monitored (i.e. the pressure measured conforms to a model), then aggregating all or part of the elementary indicators into a global indicator as a state of the pilot;

and the generation of an alarm when the state of the pilot corresponds to an incapacitation.

Advantageously, the signal processing and alarm generation steps take into account contextual information delivered by other systems on-board the aircraft.

In a variant, a pressure sensor is a device independent of the computing unit. However, it is preferable for the modeling module associated with a contact sensor to be a software in the computing unit, in order to be able to adjust the parameters of the model, such as e.g. the pressure threshold.

If appropriate, a piloting device, such as a handle, can be equipped with a plurality of contact sensors, arranged at different locations so that different positions of the pilot's hand on the handle are possible. By multiplying the measurement points or by increasing the surface area of the contact sensor, the occurrence of false alarms is limited.

If appropriate, other types of sensors can be connected to the computing unit. Same could include cameras analyzing the behavior of the pilot, accelerometers integrated into the pilot's helmet, for detecting head movements, physiological sensors such as same measuring the heart rate, a microphone analyzing the sound environment inside the cabin (in particular the sounds emitted by the pilots), etc.

Other indicators can be derived either from the signals delivered by the other sensors equipping the cockpit, or from the actuation of other cockpit equipment. For example, as illustrated in FIG. 1, the handles of the stick 40 are equipped with left-hand and right-hand buttons 43 and 44. For example, the left-hand button 43 disengages the autopilot, whereas the right-hand button allows the pilot to transmit on the radio. The actuation of either of the buttons can, as a variant, serve as an indicator of voluntary action by the pilot.

The invention claimed is:

1. A system for monitoring a pilot of an aircraft, in order to detect an incapacitation of the pilot, the aircraft being equipped with at least one piloting device which can be manually actuated by the pilot, wherein the system comprises:

at least one pressure detector generating an elementary indicator when a pressure exerted by the pilot on the piloting device is adapted to the use of the piloting device, the at least one pressure detector integrating:

a capacitive pressure sensor mounted on a surface of the piloting device; and, a modeling module, the modeling module calculating the elementary indicator from a signal delivered by the capacitive pressure sensor, a computing unit programmed for processing the elementary indicator delivered by the pressure sensor and for determining a current state of the pilot and, when said current state corresponds to an incapacitation of the pilot, for issuing an alarm; and a plurality of pressure detectors and an aggregation module suitable for aggregating all or part of the plurality of elementary indicators delivered by the plurality of pressure detectors into a global indicator as a current state of the pilot;

wherein the aggregation module selects the elementary indicators to be taken into account for calculating the global indicator according to at least one item of flight context information.

2. The system according to claim 1, wherein the pressure detector is a contact pressure detector suitable for detecting contact of the pilot's hand on the piloting device.

3. The system according to claim 1, wherein the pressure detector is a force pressure detector suitable for detecting application of a force by the pilot, on the piloting device.

4. The system according to claim 1, wherein the computing unit receives at least one item of flight context information from an auxiliary system equipping the aircraft, and wherein the computing unit processes the elementary indicator delivered by the capacitive pressure sensor taking into account the at least one item of flight context information.

5. The system according to claim 4, wherein the at least one item of flight context information is a flight phase information of the aircraft or a flight parameter information of the aircraft, the flight phase information being selected among: a taxiing phase, a take-off phase, a cruising phase, and a landing phase, and the flight parameter information being selected among: a height, a speed, an engagement status of an autopilot, a position of a noise wheel steering control, a position of a throttle, a position of a stick, and a position of a rudder-bar.

6. The system according to claim 1, wherein the computing unit comprises an alarm generation module running an algorithm using at least one item of flight context information and the global indicator determined by the aggregation module to determine whether to issue an alarm.

7. The system according to claim 1, wherein the at least one item of flight context information is a flight phase information of the aircraft or a flight parameter information of the aircraft, the flight phase information being selected among: a taxiing phase, a take-off phase, a cruising phase, and a landing phase, and the flight parameter information being selected among: a height, a speed, an engagement status of an autopilot, a position of a noise wheel steering control, a position of a throttle, a position of a stick, and a position of a rudder-bar.

8. A system for monitoring a pilot of an aircraft, in order to detect an incapacitation of the pilot, the aircraft being equipped with at least one piloting device which can be manually actuated by the pilot, wherein the system comprises:

at least one pressure detector generating an elementary indicator when a pressure exerted by the pilot on the piloting device is adapted to the use of the piloting device, the at least one pressure detector integrating:

a capacitive pressure sensor mounted on a surface of the piloting device; and, a modeling module, the modeling module calculating the elementary indicator from a signal delivered by the capacitive pressure sensor, a computing unit programmed for processing the elementary indicator delivered by the pressure sensor and for determining a current state of the pilot and, when said current state corresponds to an incapacitation of the pilot, for issuing an alarm; and a plurality of pressure detectors and an aggregation module suitable for aggregating all or part of the plurality of elementary indicators delivered by the plurality of pressure detectors into a global indicator as a current state of the pilot;

wherein the computing unit comprises an alarm generation module running an algorithm using at least one item of flight context information and the global indicator determined by the aggregation module to determine whether to issue an alarm.

* * * * *